Dec. 24, 1968  K. SCHLECHT  3,417,968
MIXING AND DELIVERING APPARATUS
Filed May 11, 1966 2 Sheets-Sheet 1
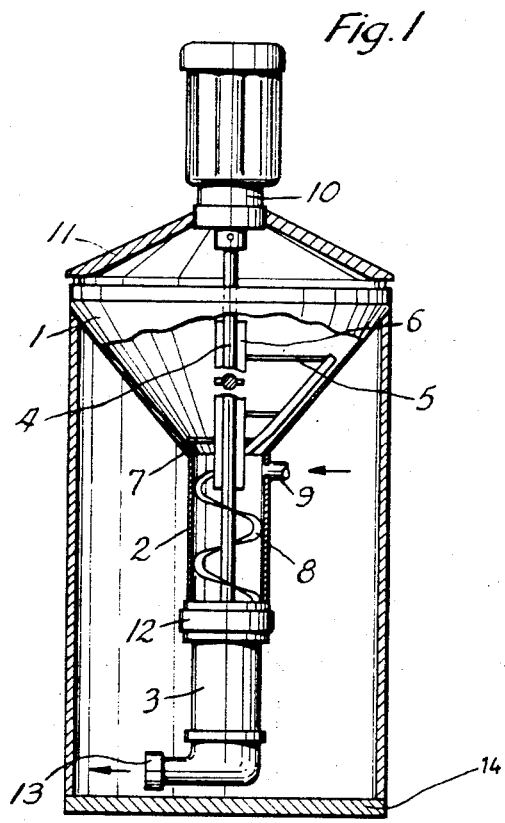
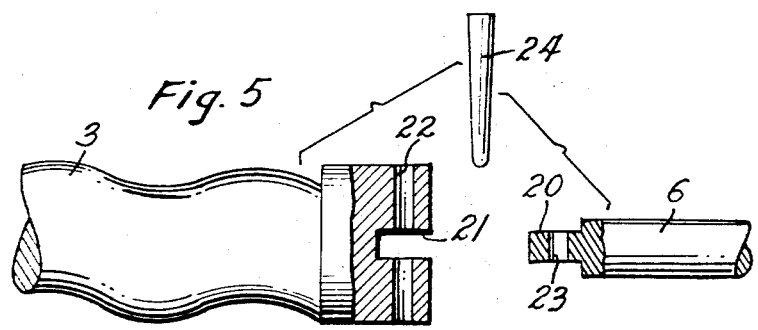
Inventor:
KARL SCHLECHT
By: nolte & nolte
ATTORNEYS Inventor:
KARL SCHLECHT
BY
Nolte & Nolte
ATTORNEYS United States Patent Office 3,417,968
Patented Dec. 24, 1968

3,417,968
MIXING AND DELIVERING APPARATUS
Karl Schlecht, 91, Echterdinger Strasse,
7024 Bernhausen, Filder, Germany
Filed May 11, 1966, Ser. No. 549,219
Claims priority, application Germany, May 12, 1965,
Sch 37,038
15 Claims. (Cl. 259—7)

ABSTRACT OF THE DISCLOSURE

Apparatus for continuously mixing a flowable particulate material with a liquid. A mixing container, in which the particulate material and the liquid are mixed, has an upper inlet end and a lower outlet end, and rotary mixing means is situated in the mixing container, a liquid supply means communicating with the mixing container for supplying liquid thereto. A pump means communicates with the container at its lower outlet end to pump the mixture therefrom, and a supply means communicates with the inlet end of the container to supply the particulate material thereto. This supply means has a lower outlet end directly connected with the upper inlet end of the mixing container and it has an interior volume which is substantially greater than the interior volume of the mixing container. A de-aerating means communicates with and is situated at least partly within the interior of the mixing container to provide a passage through which gases can escape from the mixture of the liquid and the particulate material in the interior of the mixing container.

---

The present invention relates to mixing and delivering apparatus.

In particular, the present invention relates to an apparatus for continuously mixing a flowable particulate material, usually initially in dry condition, with a liquid, and for continuously delivering the mixture of these materials to a desired location. Thus, the apparatus of the invention can be used in particular for the mixing of building materials such as, for example, gypsum or cement with water, these materials being continuously mixed in a suitable mixing container which has an outlet end communicating with a pump which delivers the mixture to a desired operating station, for example.

Most of the known apparatus of the above type require a predetermined amount of particulate material to be supplied to a relatively large maxing container where it is mixed with a predetermined amount of water, whereupon the container is emptied and then supplied with a new charge. This discontinuous type of operation for preparation of a building-material mixture, is highly unsuitable and in particular includes the disadvantage of necessitating the use of large amounts of finished mixtures of above materials, which, during pauses in the operation or in the case where only a small amount of the mixture is required, results in waste of a relatively large amount of the mixture after it has set.

It is also known to provide apparatus where the mixing container is continuously supplied with the flowable particulate material and at the same time is continuously supplied with the liquid material. With this construction also, however, it is necessary to see to it that the mixing container is continuously charged with the mixing ingredients at amounts which remain constant, so that it is necessary to derive the particulate material from a supply container of predetermined capacity which must be maintained at a predetermined, unchanging distance from the mixing container. It is possible to use with such a mixing container a liquid supply which can be controlled and which can be operated, for example, from a rotary mixing shaft which extends along the axis of the mixing container, so that the supply of liquid is controlled in accordance with the rotation of the mixing device. The disadvantage of this type of apparatus resides in the fact that it is essential to provide it with supply devices capable of uniformly charging the mixing container in a constant manner.

It is accordingly a primary object of the present invention to avoid the above drawbacks of the known apparatus.

In particular, it is an object of the present invention to provide an apparatus of the above type which is capable of continuously supplying a mixture of materials of the above type while at the same time necessitating, if there is an interruption in the operations, waste of only a small amount of material.

Thus, it is an object of the invention to provide a construction which makes it possible to continuously operate an apparatus of the above type, even though the material which is mixed is derived from a relatively large supply container which communicates with a relatively small mixing container in which at any given instant only a relatively small volume of the mixture is being prepared.

Furthermore, the objects of the present invention include the provision of an apparatus which is exceedingly simple and compact, which can be very easily cleaned, and which will operate very efficiently.

A further particular object of the present invention is to provide for an apparatus of the above type a structure which will reliably de-aerate the interior of the mixing container during operation of the apparatus.

In accordance with the invention, the apparatus includes a mixing container having an inlet and an opposed outlet end, with a mixing means situated in the interior of this mixing container. A liquid supply means communicates with the mixing container to supply liquid to the interior thereof, and a particulate-material supply means communicates also with the mixing container to supply particulate material thereto to be mixed therein with the liquid. This particulate-material supply means includes a supply container which has an outlet end directly connected with the inlet end of the mixing container, and this supply container has an interior volume which is substantially greater than the interior volume of the mixing container. A pump means communicates with the outlet end of the mixing container for pumping the mixture therefrom, and a de-aerating means communicates with the interior of the mixing container for providing a passage through which gas can escape from the interior of the mixing container.

The invention is illustrated by way of example in the accompanying drawing which forms part of the application and in which:

FIG. 1 shows the invention schematically illustrated in a vertical sectional elevation, the section being taken in a plane which extends substantially centrally through the apparatus;

FIG. 5 is a fragmentary partly sectional elevation showing how components can be releasably connected.

Figure 2:
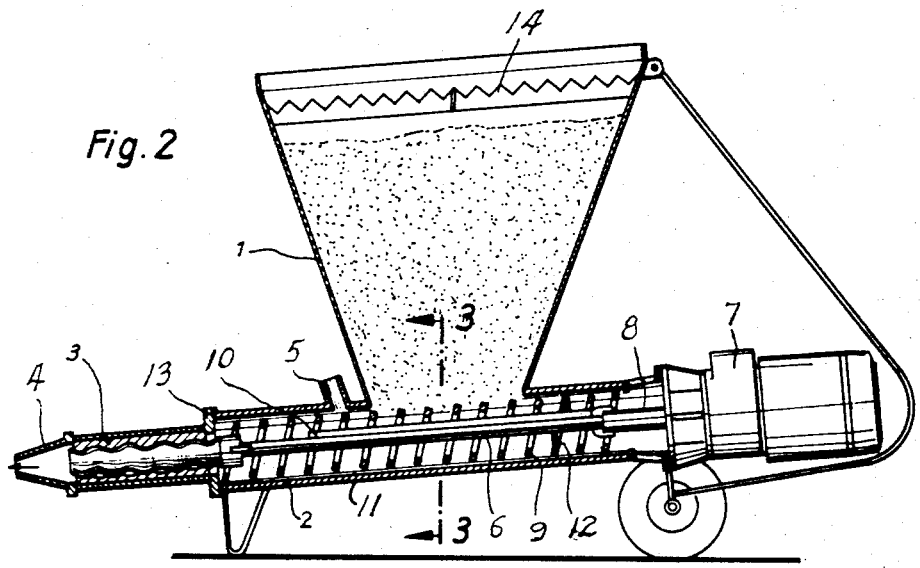
FIG. 2 is a longitudinal section showing in elevation another embodiment of an apparatus according to the invention.

Referring now to the drawing, and to FIG. 1 in particular, there is shown therein a supply means for the particulate material, this supply means including a downwardly tapered supply container 1 having a bottom outlet end which directly communicates with the upper inlet end of an elongated mixing container 2 which forms part of a flow-through mixer in which the ingredients are mixed while continuously travelling through the mixer. This mixing container 2, in addition to having an upper inlet end, which is connected directly with the outlet of the supply container 1, has a bottom outlet end through which the mixed material can flow from the interior of the container 2. By means of a quickly operable and extremely convenient coupling structure 12, a pump means 3 is connected to and communicates with the bottom outlet end of the mixing container 2 so as to pump the material therefrom. This coupling means 12 can take the form of an exterior ring which is internally threaded and which is turnably carried by the pump means 3 at its top end for quick threading onto an exteriorly threaded bottom end of the container 2. In this way, the pump 3 can be very quickly attached to the outlet end of the container 2.

The outlet of the pump communicates with an angular conduit in the form of an elbow which changes the direction of flow of the material so that it can be delivered horizontally, to the left as shown by the arrow at the lower part of the drawing, to any desired location through a suitable conduit arrangement. The angular pipe or elbow which communicates with the outlet of the pump is provided at its end distant from the pump with a coupling 13 through which the conduit structure for conveying the mixture can be coupled to the outlet of the pump.

The driving structure for the apparatus of the invention includes an elongated drive shaft 4 which extends through the supply container 1 and the mixing container 2, these containers together with the pump 3 having a common vertical axis and being arranged, as shown, with the supply container over the mixing container and the mixing container over the pump. The drive shaft 4 extends along the common axis of the containers and the pump through the supply container and the mixing container and is operatively connected at its bottom end to the rotor of the pump for driving the latter. The pump means 3 preferably takes the form of a rotary, screw-type, positive displacement pump having a single screw eccentrically arranged with respect to the common axis of the pump and the containers so that as the screw turns to positively displace the mixture it also continues the mixing thereof. The upper end of the screw-type rotor of the pump is releasably connected with the bottom end of the drive shaft 4 through any suitable releasable coupling structure.

In order to maintain the particulate material in the supply container 1 in a loose condition where it will readily flow downwardly into the mixing container, the drive shaft 4 fixedly carries material-loosening arms 5 which may be in the form of relatively flat iron members fixed to and extending radially from the shaft 4.

During the mixing of the ingredients in the interior of the mixing container 2, in a manner described below, gases, such as air, develop and become entrained in the mixture, and the structure of the invention includes a de-aerating means which provides a passage through which the gas can freely escape from the interior of the mixing container 2. In this way the mixture can be of a relatively dense consistency free of any air bubbles, and there will be no formation of any air pockets which will detract from the efficiency of the mixing action. This de-aerating means in the illustrated example takes the form of a pair of fins 6, in the form of flat symmetrically arranged iron elements fixed to diametrically opposed portions of the shaft 4 and extending longitudinally therealong through the supply container 1 as well as through the outlet of the latter and the inlet of the mixing container 2 into the interior of the mixing container, as shown. In the drawing the illustration of the drive shaft 4 and the de-aerating fins 6 is interrupted just above the outlet of the supply container to show at this interruption the cross-sectional configuration of the supply shaft and de-aerating fins 6. Thus, as shown in the drawing these fins 6 have a thickness which is substantially smaller than the diameter of the shaft 4. During rotation of the shaft 4 the fins 6 will provide a relatively small passage around the shaft 4 maintained free of the particulate material in the container 1 and providing an escape passage through which the air or other gas in the container 2 can freely escape upwardly through the material in the container 1 and out to the atmosphere.

Situated directly over the outlet opening of the supply container 1 is a closure plate 7 which is located in a horizontal plane and which is fixed to the shaft 4 for rotation therewith. This plate 7 extends over only part of the outlet of the container 1 and this outlet may in addition be provided with an adjustable structure capable of adjusting the size of the opening through which the material flows from the container 1 into the mixing container 2. The closure plate 7 itself may be fixed in an adjustable manner to the shaft 4. The arrangement is such that when the structure is not operating the interior of the supply container 1 is completely closed off from the interior of the mixing container 2, so that in this way when there is an initial supply of particulate material delivered through the open top of the supply container 1 into the interior thereof, this particulate material cannot, while the shaft 4 does not rotate, flow downwardly into the mixing container 2, forming a stationary mass of particulate material therein and rendering the starting of the operation difficult to carry out. Thus, with this construction the apparatus will not be plugged up, and it cannot be placed in condition where it is difficult to start.

Figure 4:
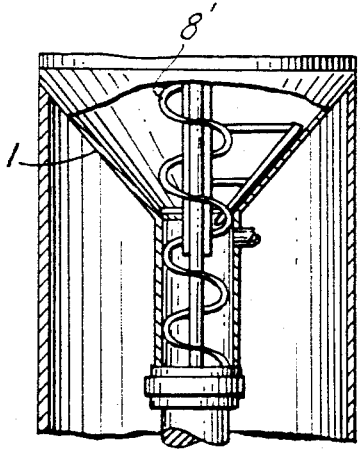
FIG. 4 is a fragmentary sectional elevation showing another embodiment.

In the interior of the mixing container 2 is situated a mixing means which includes not only the portion of the drive shaft 4 which extends through the mixing container 2, but also a spiral, helically extending stirring member 8 which is fixed to the drive shaft 4 for rotation therewith and which continuously mixes, during the rotation of the shaft 4, the ingredients which are supplied to the interior of the container 2 in such a way that these ingredients are not only thoroughly mixed, but in addition they are circulated in the interior of the container 2 providing a highly homogeneous mixture with any gases which develop during the mixing or which become entrained with the ingredients being free to escape through the passage provided by the de-aerating means 6. Referring to FIG. 4, it will be seen that according to this embodiment a helical fin 8' may extend upwardly through the interior of the supply container 1, extending helically around the drive shaft so as to form part of a de-aerating means by providing along the shaft a passage through which gases can escape.

The liquid, such as water is continuously supplied through the liquid supply means 9 in the form of a suitable conduit communicating with the interior of the mixing container adjacent its upper inlet end and receiving a supply of liquid from any suitable source, the flow of liquid through the liquid supply means 9 being automatically regulated by a suitable control device which is connected with the pump means 3 so as to control the supply of liquid according to the speed of operation of the pump means 3. Thus, the particulate material which slides down from the container 1 into the interior of the mixing container 2 is continuously mixed and blended with the liquid.

A support means is carried by the upper edge of the container 1 for supporting a driving motor 10 which is operatively connected with the top end of the drive shaft 4 through any suitable releasable coupling structure which upon release enables the motor 10 to be turned to an inoperative position or to be raised away from the apparatus. This support means takes the form of a plurality of struts 11 connected at their bottom ends to the top edge of the hopper 1 and at their top ends to a suitable bearing which supports the motor 10 and which in addition provides a bearing supporting the top end of the shaft 4 for rotary movement. A plurality of upright supporting bars are distributed around the common axis of the containers and pump means and are fixed at their top ends to the underside of the container 1, adjacent the top end of the latter, and at their bottom ends to a suitable base plate 14, which, if desired, may be mounted on suitable rollers so that the entire apparatus can be easily displaced to any desired location.

If it should happen that the apparatus becomes stopped up or requires cleaning for any reason, the coupling between the motor and the drive shaft can be released, and the motor can be raised or laterally turned to one side, so that the drive shaft 4, together with the mixing means 8 and the rotary screw of the pump 3 can be raised out of the apparatus freeing the interior surface thereof for a complete and easy cleaning. The opening at the outlet of the container 1, which can be covered by the plate 7 which is fixed to the shaft 4, is large enough to permit upward movement of the mixing means 8 and the pump screw therethrough.

As may be seen from FIG. 5, a releasable connection between the drive means and the pump means can be achieved by providing the drive shaft 6 with a tongue 20 received in a notch 21 formed at the inner end of the rotary pump member 3 shown in FIG. 5. The right end of the latter is formed with a bore 22 which is aligned with a bore 23 of the shaft 6, and a connecting pin 24 is removably situated in the aligned bores 22 and 23 for releasably connecting the drive to the pump means.

It should be noted that instead of supplying special fins 6 to constitute the de-aerating means of the invention, it is possible to use for this purpose a drive shaft 4 which is of a non-circular cross section, such as, for example, a square or rectangular cross section, so that in this case also the rotary movement of such a drive shaft will automatically form an escape passage for the gases. In this case also the escape passage will be in the form of a hollow relatively small space surrounding the drive shaft and extending through the particulate material.

It is to be noted that the control of the consistency of the mixture delivered by the pump means is regulated by automatically controlling the supply of liquid from the pump means itself, so that a special metering device for the particulate material is not required with the structure of the invention.

In addition, it is to be noted that with this arrangement the consistency of the material derived from the pump means will remain constant because if there should be any variations in the speed of rotation of the pump means this will provide an automatic compensating control of the supply of liquid, thus maintaining the material consistency constant even under these conditions.

The advantage of using a single-screw positive displacement pump where the screw is eccentrically arranged resides not only in the fact that there is an additional mixing of the material in the pump itself, but also in the fact that the rotary movement of the screw about an axis parallel to the screw axis results also in the formation of a space around the drive shaft in the region of the pump, thus further contributing to the formation of a space through which gases can escape from the interior of the mixing container upwardly through the passage provided by the de-aerating means of the invention.

The quickly releasable and restorable connections between the drive shaft 4 and the motor 10, on the one hand, and the screw of the pump 3, on the other hand, preferably takes the form of plug-and-socket types of connections.

Figure 3:
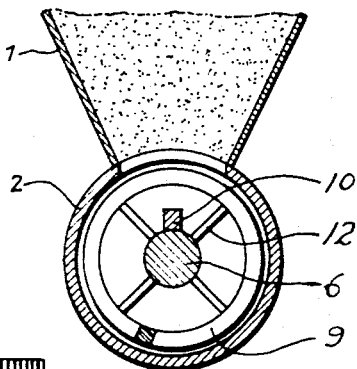
FIG. 3 is a fragmentary transverse section taken along line 3—3 of FIG. 2 in the direction of the arrows.

For some purposes it is desired to have, as shown in FIGS. 2 and 3, an apparatus which is of an extremely low construction, so that the entire apparatus does not extend to an elevation which is situated at an undesirable distance above the base plate 14. With such construction it is easier to charge the supply container 1. For this purpose it is possible to arrange the apparatus in such a way that the pump means 3, and if desired, the mixing container 2, with the mixing means therein, are arranged along a horizontal axis or have only a slight inclination from the horizontal. These components are in this case situated beneath the supply container 1 to receive the material therefrom. However, the above-described structure shown in the drawing is preferred, particularly because of the ease with which it lends itself to the inclusion of the de-aerating apparatus of the invention.

Thus, referring to FIGS. 2 and 3, it will be seen that the elongated mixing container 2 extends substantially horizontally and communicates at an upper intermediate portion with the lower outlet end of the supply container 1 which is provided, for example, at its upper portion with a suitable sieve or the like 14 through which the particulate material is introduced into the container 1. Furthermore, FIG. 2 illustrates how the coupling 13 couples the screw pump 3 to the outlet end of the mixing container 2. The driving motor 7 has its shaft 8 connected with the rotary shaft 6 to which is fixed the longitudinally extending de-aerating fin 10 which forms the de-aerating means of this embodiment, and it is to be noted that the right end of the mixing container 2, as viewed in FIG. 2, communicates with the outer atmosphere at the region where it is connected with the support for the motor 7, so that in this way the air developed in the interior of the mixing container 2 can freely escape. Liquid is introduced through the inlet 5 shown in FIG. 2, and a rotary screw-type of feeding conveyor 9 extends around the drive shaft 6 of the mixing container and is connected therewith through arms 12 so that in this way the material is mixed and advanced along the container 2 which is defined by an outer housing 11, as indicated in FIG. 2.

FIG. 2 also shows the discharged nozzle 4 through which the material discharges from the positive-displacement type of rotary screw pump 3, indicated in FIG. 2. Of course, the pump 3 of FIG. 1 is of the same type, and also the helical mixing member 8 of FIG. 1 is fixed to the shaft 4 of FIG. 1 by way of elements such as the elements 12 shown in FIG. 3.

Furthermore, FIG. 2 shows how the entire apparatus can be raised and rolled, in the manner of a wheelbarrow, or the apparatus can be hitched to the rear end of a truck or the like, so that it is easily transportable to the desired location.

It will be noted that with the structure of the invention while a relatively high output can be achieved, nevertheless at any given instant there is only a relatively small amount of material being formed into a mixture in the container 2, so that if there is an unexpected pause in the operations for any reason, any material which sets in the container 2 will not be excessive in amount and in addition can easily be removed by way of the above-discussed releasable coupling structures, so that an extremely simple and quick cleaning of the apparatus can be maintained. Furthermore, it will be noted that with the structure of the invention there are no dead spaces in which material can accumulate and set in an undesirable manner.

When the operations are stopped in the usual manner, as at the end of the working day, the apparatus of the invention is operated in such a way that the supply container 1 first becomes completely empty simply by gravitational flow of the particulate material therefrom, and then the entire remainder of the apparatus can be very quickly cleaned by permitting the water to flow therethrough from the liquid supply means which is situated near the upper end of the mixing container 2. Thus, after the apparatus has been emptied of particulate material, the water can be permitted to flow through the apparatus, providing a quick and effective cleaning thereof in an extremely convenient manner. Thus the same liquid supply which is used during the operation is also used for normal cleaning of the apparatus, and the water derived from the liquid supply with the structure of the invention will quickly flow through and clean all of the mixing structure as well as the pump structure and any other structure to which the mixture is delivered, such as the conduit means and additional apparatus, if any. Thus, unproductive time required for cleaning purposes is greatly reduced with the structure of the invention.

The foregoing disclosure relates only to preferred embodiments of the invention which is intended to include all changes and modifications of the examples described within the scope of the invention as set forth in the appended claims.

What is claimed is:

1. In an apparatus for continuously mixing a flowable particulate material with a liquid and for continuously delivering the resulting mixture to a predetermined location, a mixing container in which the particulate material and liquid are mixed, said container having an inlet end and an opposed outlet end, rotary mixing means situated in said mixing container, liquid supply means communicating with said container for supplying liquid thereto, pump means communcating with said container at said outlet end thereof for pumping the mixture therefrom, supply means communicating with said inlet end of said container for supplying the particulate material thereto, said supply means including a supply container having an outlet end directly connected with said inlet end of said mixing container and said supply container having an interior volume substantially greater than the interior volume of said mixing container, and de-aerating means communicating with and situated at least partly within the interior of said mixing container for providing a passage through which gases can escape from the mixture of liquid and particulate material in the interior of said mixing container.

2. The combination of claim 1 and wherein said rotary mixing means includes a rotary drive shaft, said de-aerating means extending along the axis of said drive shaft, being fixed thereto for rotation therewith, being situated in the immediate vicinity of said rotary drive shaft, and said mixing container having an outer wall situated at a substantial distance from said de-aerating means, so that the latter provides along said drive shaft a passage through which gases can escape from the interior of said mixing container.

3. The combination of claim 1 and wherein said inlet end of said mixing container is situated over said outlet end thereof wth said supply container situated over said mixing container and said pump means situated directly beneath said mixing container.

4. The combination of claim 1 and wherein said pump means is a rotary, screw-type, positive displacement pump, an elongated drive shaft operatively connected to said pump for driving the latter, said shaft extending through said supply container and said mixing container, said mixing means being operatively connected to said drive shaft to be driven thereby in said mixing container, and said de-aerating means being operatively connected to said drive shaft also to be driven thereby, said de-aerating means being situated in the region of said supply container.

5. In an apparatus as recited in claim 4, said de-aerating means including at least one elongated fin fixed to and extending longitudinally of said drive shaft for rotation therewith and extending through said supply container, said fin being situated in its entirety in the immediate vicinity of said drive shaft and said mixing container having an outer wall spaced at a substantial distance from said fin so that the latter forms along said drive shaft a passage through which gases can escape.

6. The combination of claim 5 and wherein said de-aerating means includes a pair of diametrically opposed fins fixed to and extending longitudinally of said drive shaft and arranged symmetrically with respect thereto, both of said fins having the structure of said one fin.

7. The combination of claim 4 and wherein said de-aerating means includes an elongated fin fixed to said drive shaft for rotation therewith and extending through said supply container, said fin extending helically around said drive shaft, being fixed thereto for rotation therewith, being situated in its entirety in the immediate vicinity of said drive shaft, and said mixing container having an outer wall spaced at a substantial distance from said fin so that the latter provides along the drive shaft a passage through which gases can escape.

8. The combination of claim 1 and wherein a rotary drive shaft extends from the interior of said supply container through said mixing container and is operatively connected to said mixing means therein, and a closure plate situated in the region of the outlet of said supply container, partially closing said outlet, and fixed to said shaft for rotary movement therewith.

9. The combination of claim 1 and wherein a control means is operatively connected with said liquid supply means for controlling the latter according to the speed of rotation of said pump means, said pump means being a screw-type, positive displacement pump.

10. The combination of claim 1 and wherein said pump means is a rotary, screw-type, positive displacement pump having a single screw eccentrically arranged with respect to its axis of rotation.

11. The combination of claim 1 and wherein an elongated drive shaft extends through said supply container and through said mixing container to said pump means for driving the latter, said drive shaft being operatively connected with said mixing means for driving said mixing means, and a motor operatively connected with that end of said drive shaft which is distant from said pump means for rotating said drive shaft, said drive shaft being releasably coupled with said motor, on the one hand, and with said pump means, on the other hand.

12. The combination of claim 1 and wherein said supply container is situated directly over said mixing container and said mixing container is situated directly over said pump means, an elongated drive shaft extending substantially vertically through said supply container and said mixing container and being operatively connected to said pump means and mixing means for driving the same, said drive shaft having an upper end situated in the region of the upper end of said supply container, a motor operatively connected to said upper end of said shaft for driving the latter, and support means carried by said supply container at an upper edge thereof and supporting said motor, said support means also supporting said drive shaft for rotary movement.

13. The combination of claim 12 and wherein said support means supports said motor for releasable connection with said drive shaft.

14. The combination of claim 1 and wherein said pump means is in the form of a rotary, screw-type, positive displacement pump, said pump means being situated beneath said mixing container, having a substantially horizontal axis, and having its own drive means.

15. The combination of claim 1 and wherein said supply container, said mixing container, and said pump means are arranged along a common substantially vertical axis with said mixing container situated between said supply container and said pump means, and a single motor operatively connected with said mixing means and said pump means for driving both said mixing means and said pump means.

References Cited

UNITED STATES PATENTS

| | | | |
|---|---|---|---|
| 1,459,657 | 6/1923 | Dempsey | 259—168 |
| 1,577,218 | 3/1926 | Fletcher | 259—165 XR |
| 1,954,005 | 4/1934 | Westberg et al. | 259—168 XR |
| 2,370,469 | 2/1945 | Johnson et al. | |
| 2,694,224 | 11/1954 | Rhodes. | |
| 2,704,658 | 3/1955 | Gordon | 259—8 |
| 2,805,051 | 9/1957 | Miller | 259—8 XR |
| 2,957,427 | 10/1960 | O'Conner | 259—7 XR |
| 3,006,615 | 10/1961 | Mason | 259—168 XR |

FOREIGN PATENTS 226,652 4/1963 Austria.

WALTER A. SCHEEL, *Primary Examiner.*

JOHN M. BELL, *Assistant Examiner.*

U.S. Cl. X.R.

18—12; 259—23